United States Patent
Chang et al.

(10) Patent No.: US 7,411,566 B2
(45) Date of Patent: Aug. 12, 2008

(54) SYSTEM AND METHOD FOR A PORTABLE TERMINAL HAVING A DUAL DISPLAY MODULE STRUCTURE

(75) Inventors: Young Hoon Chang, Suwon (KR); Woo Ki Song, Seoul (KR)

(73) Assignee: Hana Micron, Asan-Si, Chungcheongnam-Do (KR)

( * ) Notice: Subject to any disclaimer, the term of this patent is extended or adjusted under 35 U.S.C. 154(b) by 330 days.

(21) Appl. No.: 11/349,557

(22) Filed: Feb. 6, 2006

(65) Prior Publication Data

US 2006/0214872 A1    Sep. 28, 2006

(30) Foreign Application Priority Data

Mar. 24, 2005    (KR)    ............... 20-2005-0008008

(51) Int. Cl.
G09G 5/00    (2006.01)
(52) U.S. Cl. .............. 345/1.1; 345/168; 206/45.26
(58) Field of Classification Search ............ 345/1.1, 345/204, 168, 174; 178/18.01, 18.03; 206/45.24, 206/45.26, 286; 341/22; 235/375; 361/679–687, 361/724–727
See application file for complete search history.

(56) References Cited

U.S. PATENT DOCUMENTS

2005/0237702 A1* 10/2005 Kee et al. ............... 361/681
2006/0197714 A1*  9/2006 Chang ................... 345/1.1
2008/0068781 A1*  3/2008 Kim ...................... 361/600

FOREIGN PATENT DOCUMENTS

KR    1020020012880 A    2/2002

* cited by examiner

Primary Examiner—Hung V Duong
(74) Attorney, Agent, or Firm—Graybeal Jackson Haley LLP

(57) ABSTRACT

A portable terminal has the dual display module structure in which a plurality of panels provided in the portable terminal are combined with clear conjunction to display a distortion-less large screen display. The portable terminal includes a first display panel unit for displaying a first image, a second display panel unit for displaying a g the second display panel unit with the first display panel unit with supporting rotational shift, and a film connecting unit facing the hinge unit. A film is inserted in the connecting unit for connecting the first display panel unit with the second display panel unit electrically.

20 Claims, 3 Drawing Sheets

SYSTEM AND METHOD FOR A PORTABLE TERMINAL HAVING A DUAL DISPLAY MODULE STRUCTURE

PRIORITY CLAIM

This application claims priority from Korean Patent Application No. 20-2005-0008008, filed Mar. 24, 2005, which is incorporated herein by reference.

FIELD OF THE INVENTION

The present invention relates to a portable terminal, and more particularly, to a portable terminal having a dual display module in which a main display panel unit and a sub-display panel unit are combined with clear conjunction to display a large screen image without distortion.

BACKGROUND OF THE INVENTION

In general, a portable terminal is a device, commonly called mobile communication terminal such as digital phone, cellular phone, PCS phone, a portable digital terminal such as a personal digital assistant (PDA), or a small-sized notebook computer. Typically, it is connected with a wireless communication link to provide various digital content such as audio and image information to a user.

Such a portable terminal has been improved with the aim of high sensitivity and size/weight reduction for maximizing its portability as a key function, and this trend may be found when we see how a mobile communication terminal, representative of a portable terminal, has been developed.

In other words, bar-type or flip-type terminals among early mobile communication terminals are rarely used in recent years because of the difficulty in expanding a display unit of the terminal, as well as the terminal's big size and heavy weight. Recently, however, sliding folder-type or folder-type terminals have been widely used due to their small size and light weight as well as the expansion capability of the display unit in such terminals.

On the other hand, wireless data services are popularized in recent years, and it is a general tendency that the multimedia content providing function of a portable terminal becomes more important than any other classical functions provided by this portable terminal, such as the speech function in the case of a mobile communication terminal and the data input function in the case of PDAs. In order to achieve the multimedia content providing function and, in particular, the effective image content providing function through a portable terminal, an important factor is how well image content that has been received from a communication network is displayed through the display unit of the terminal.

As explained above, however, the size of display panel should be restricted in order to enhance the portability of the terminal. As a result, there is difficulty in displaying high quality video content on conventional display panels or units in portable terminals.

SUMMARY OF THE INVENTION

According to one aspect of the present invention, a portable terminal has an expanded screen by combining a plurality of display panels.

According to another aspect of the present invention, a hinge structure combines a plurality of display panels of a portable terminal with more clear conjunction.

A portable terminal according to an embodiment of the present invention comprises a first display panel unit for displaying a first image; a second display panel unit for displaying a second image; a hinge unit for connecting the second display panel unit with the first display panel unit with supporting rotational shift; and a film connecting unit facing the hinge unit, wherein a film is inserted for connecting the first display panel unit with the second display panel unit electrically.

According to an embodiment of the present invention, the hinge unit comprises a first hinge member mounted on the first display panel unit and having a cut piece and a connecting piece of which both sides are open; a second hinge member mounted on the second display panel unit and having one side which is open so as to communicate with one side of the first hinge member; and a hinge axis inserted into the first and the second hinge members. The hinge axis may have a first hinge piece inserted into the first hinge member and a second hinge piece inserted into the second hinge member, and the diameter of the first hinge piece is greater than the diameter of the second hinge piece.

According to an embodiment of the present invention, the film connecting unit comprises a first film connecting member having a connecting piece protruded from the first display panel unit, and a supporting piece caved or recessed in the first display panel unit; and a second film connecting member mounted on the second display panel unit and rotationally supported by the supporting piece of the first film connecting member.

The connecting piece of the first film connecting member may have upper portion protruding from the first display panel unit and a lower portion guided into the inside of the first display panel unit, with one side of the upper portion being closed, the other side of the upper portion being open, and the left and right sides of the lower portion being open.

Moreover, the second film connecting member may have a cylindrical shape, with one side of the second film connecting member being open to communicate with one side of the lower portion of the connecting piece, and a combining portion being formed to protrude in the circumferential direction in one side of the second film connecting member, and the combining portion being rotationally combined with the connecting piece of the first film connecting member.

A film for connecting the first display panel unit with the second display panel unit electrically is provided to pass through the connecting piece of the first film connecting member and the second film connecting member.

BRIEF DESCRIPTION OF THE DRAWINGS

These and other features, aspects and advantages of the present invention will become better understood with reference to the following description, appended claims, and accompanying drawings where:

DETAILED DESCRIPTION OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
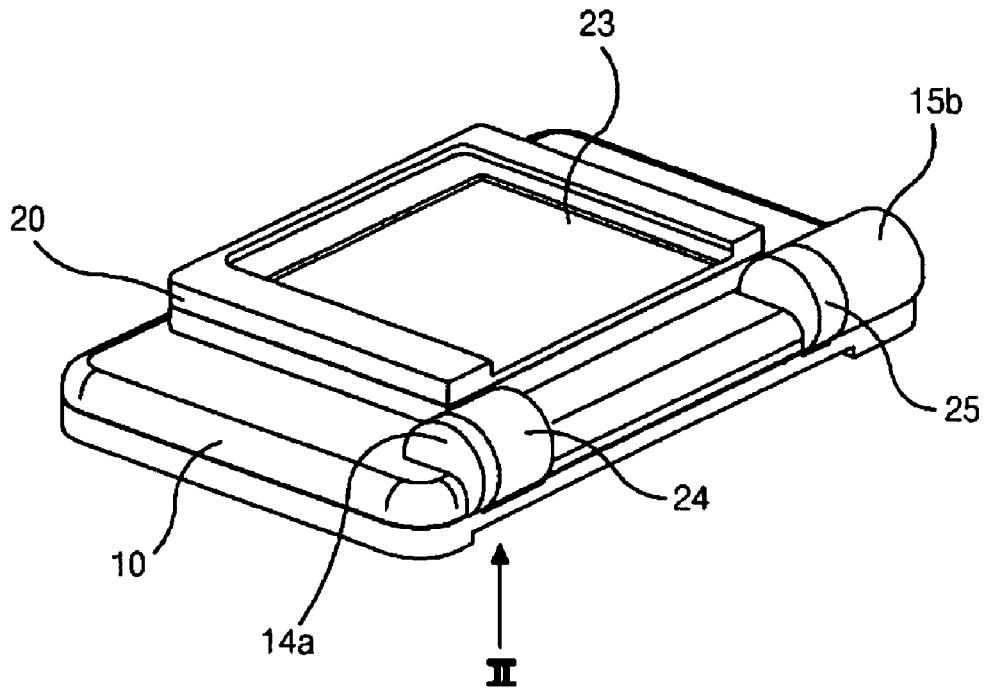
FIG. 1 shows a dual display panel of a portable terminal according to an embodiment of the present invention when it is folded.
Figure 2:
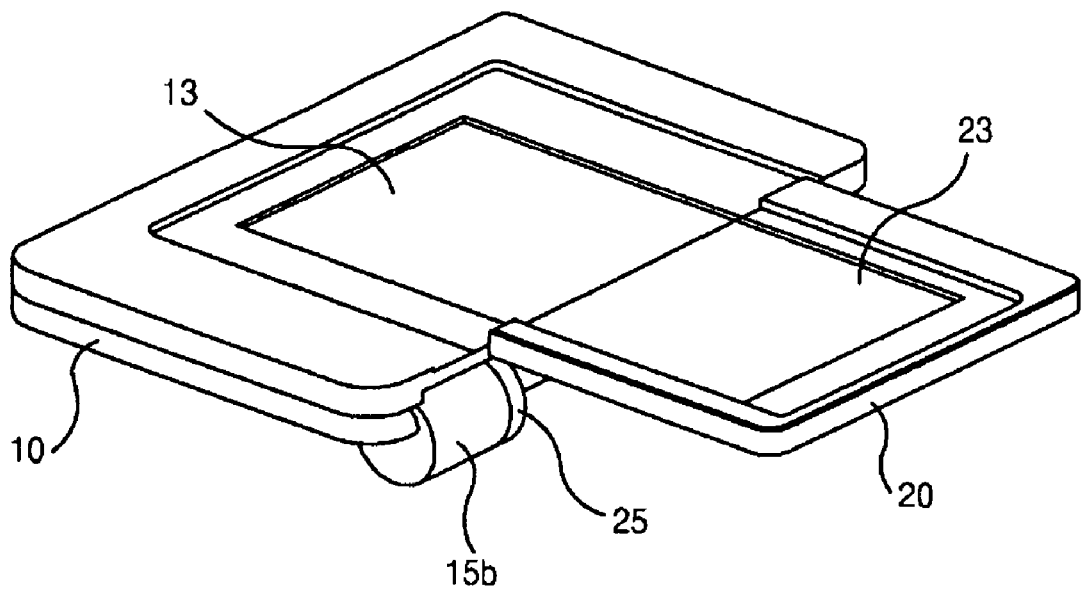
FIG. 2 shows the dual display panel of the portable terminal when it is unfolded and seen from the direction of the arrow 11 in FIG. 1.
Figure 3:
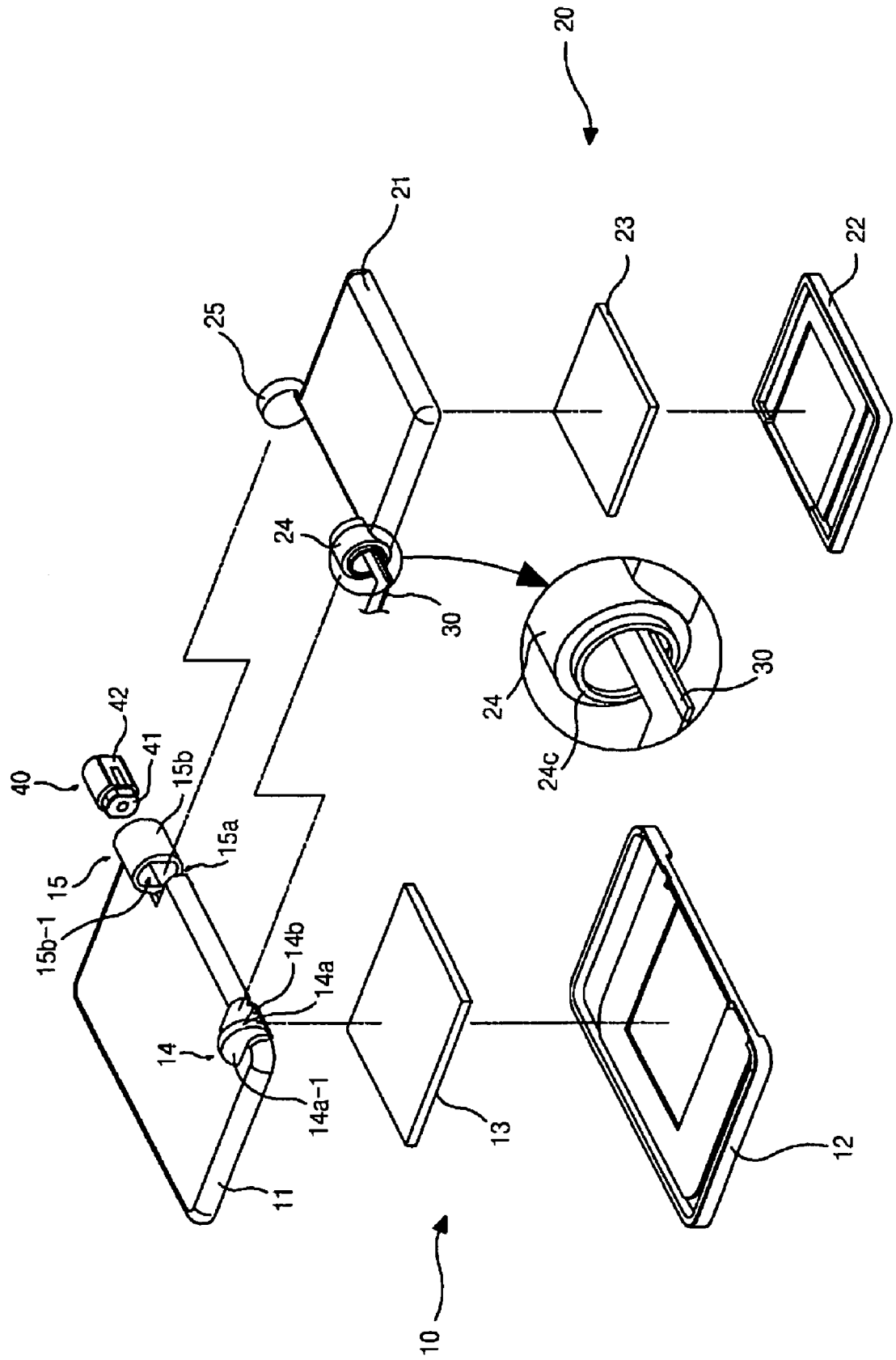
FIG. 3 shows a perspective view of a dual display module structure according to an embodiment of the present invention.

FIGS. 1 to 3 show a dual display module for a portable terminal according to an embodiment of the present invention.

As shown in FIG. 1, the dual display module according to an embodiment of the present invention comprises a main display panel unit 10, and a sub-display panel unit 20 combined with the main display panel unit 10 through a hinge.

The main display panel unit 10 has upper/lower cases 11 and 12 and a main flat screen 13 formed in the upper/lower cases 11 and 12, as shown in FIG. 3.

A first film connecting member 14 and a first hinge member 15 are mounted on an edge of the upper case 11 to connect the sub-display panel unit 20.

The first film connecting member 14 has a connecting piece 14a of a cylindrical shape, and a supporting piece 14b caved or recessed in the upper case 11.

The connecting piece 14a is provided in such a manner that its upper portion protrudes from the edge of the upper case 11, and its lower portion is guided into the inside of the upper case 11, and an upper side 14a-1 of the connecting piece 14a is closed.

Figure 4:
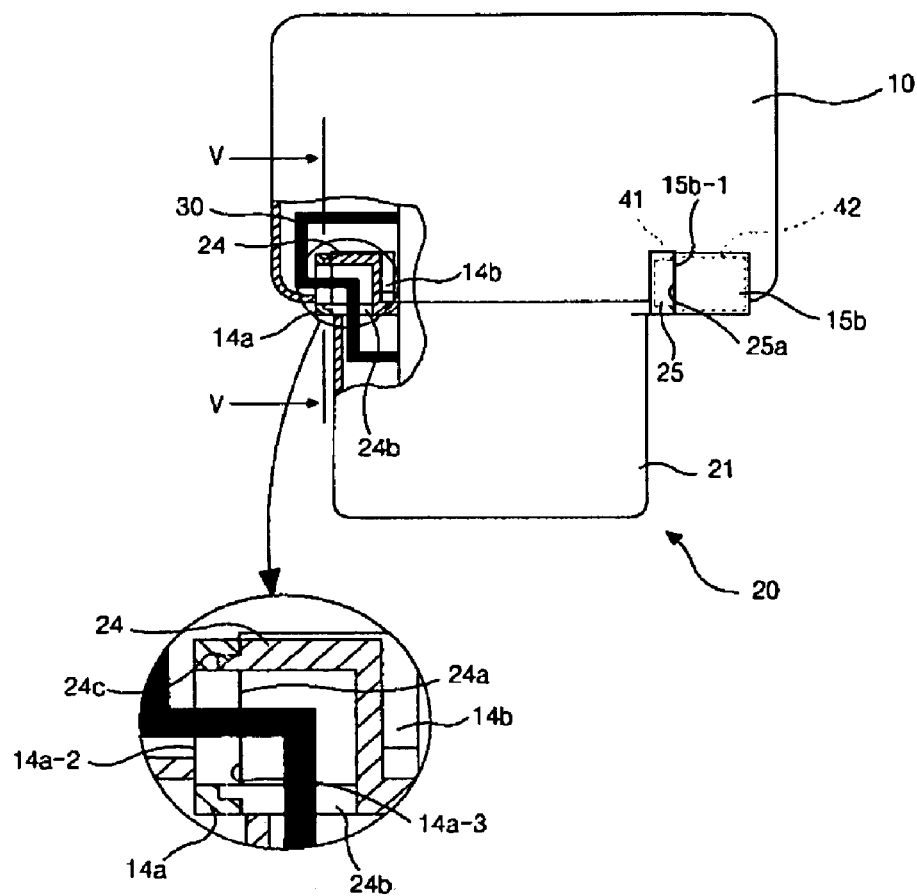
FIG. 4 shows a cross-sectional bottom view partially illustrating a lower portion of a connecting piece that is guided into the inside of an upper case in the main display panel unit, and the second film connecting member in the sub-display panel unit in a state where the dual display panel is folded according to an embodiment of the present invention.

A lower portion of the connecting piece 14a is guided into the upper case 11. As left and right sides 14a-2 and 14a-3 of the lower portion are open as illustrated in FIG. 4, the left side 14a-2 is communicated with an inner portion of the upper case 11 in the main display panel unit 10, and the right side 14a-3 is communicated with the second film connecting member 24 in the sub-display panel unit 20 to be described later.

Accordingly, a PCB film 30 can be inserted through the left and right sides 14a-2 and 14a-3 of the lower portion of the connecting piece 14a and guided into the upper case 11.

Moreover, the outer diameter of this connecting piece 14a is determined corresponding to the outer diameter of the second film connecting member 24 in the sub-display panel unit 20 to be described later.

Figure 5:
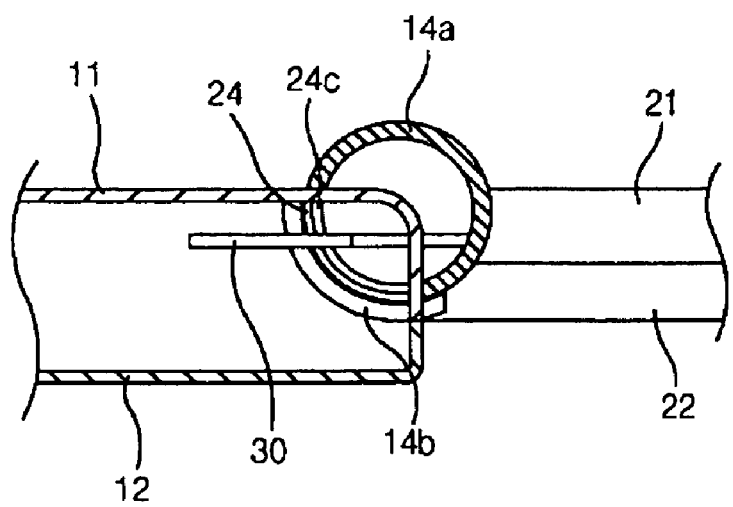
FIG. 5 shows a cross-sectional view illustrating the first and second film connecting members taken along the line V-V in the embodiment of FIG. 4.

The supporting piece 14b is caved or recessed in the upper case 11 with a curve from the side of the connecting piece 14a (in a downward direction in FIG. 5). And, the second film connecting member 24 in the sub-display panel unit 20 is inserted and rotationally supported by the supporting piece 14b.

The first hinge member 15 has a cut piece 15a and a connecting piece 15b.

The cut piece 15a is formed by cutting a width and in which a second hinge member 25 of the sub-display panel unit 20 is inserted.

The connecting piece 15b has a cylindrical shape. And, one side 15b-1 of the connecting piece 15b is open, and its outer diameter is determined corresponding to the outer diameter of the second hinge member 25 in the sub-display panel unit 20.

On the other hand, the main display panel unit 10 can be connected to the main body of portable terminal in the folder or bar shape.

The sub-display panel unit 20 includes upper and lower cases 21 and 22 and a sub-flat screen 23 formed in upper and lower cases 21 and 22.

The second film connecting member 24 and the second hinge member 25 are mounted on an edge of the upper case 21 to connect the sub-display panel unit 20 with the main display panel unit 10.

The second film connecting member 24 is mounted on the edge of the upper case 21 and formed with a cylindrical shape of which one side 24a is open, and inner surface 24b is open to communicate with the inside of the upper case 21. And, the second film connecting member 24 is accommodated in the supporting piece 14b of the first film connecting member 14 and rotationally supported.

At a rim of the one side 24a of the second film connecting member 24, a combining piece 24c is formed protruding in the circumferential direction, and the combining piece 24c is rotationally combined with the connecting piece 14a of the first film connecting member 14. Therefore, the second film connecting member 24 is rotationally supported while being guided by the combining piece 24c for its rotational operation by the combining piece 24c.

On the other hand, one side 24a of the second film connecting member 24 is communicated with a lower right side 14a-3 of the connecting piece 14a in the main display panel unit 10. Therefore, a PCB film can be inserted.

The second hinge member 25 has a cylindrical shape of which one side 25a is open. And, the second hinge member 25 is inserted into a cut piece 15a of the first hinge member 15 in the main display panel unit 10.

On the other hand, one side 25a of the second hinge member 25 and one side 15b-1 of the connecting piece 15b of the first hinge member 15 are combined to communicate each other, and a hinge axis 40 is inserted in the first hinge member 15 of the main display panel unit 10 and the second hinge member 25 of the sub-display panel unit 20 through sides 25a and 15b-1. Accordingly, the main display panel unit 10 and the sub-display panel unit 20 are rotationally combined with each other.

This hinge axis 40 includes a hinge piece 41 inserted into the second hinge member 25 in the sub-display panel unit 20 and a hinge piece 42 inserted into the hinge connecting piece 15b in the main display panel unit 10.

Preferably, the diameter of the hinge piece 41 is smaller than the diameter of the hinge piece 42 to facilitate a relative rotational operation between the main display panel unit 10 and the sub-display panel unit 20.

On the other hand, the main display panel unit 10 and the sub-display panel unit 20 are electrically connected through the PCB film 30, and such a PCB film 30 is commonly called a flexible IC package, such as TCP (Tape Carrier Package), and COF (Chip on Film).

One end of the PCB film is connected to a flat screen 13 of the main display panel unit 10, and the other end is connected to a sub-flat screen 23 of the sub-display panel unit 20. The PCB film passes through openings 14a-2, 14a-3, 24a, and 24b in the connecting piece 14a of the first film connecting member 14 and the second film connecting member 24 of the sub-display panel unit 20.

In other words, the PCB film 30 is configured in such a manner that the flat screens 13 and 23 are connected to each other through the first and second film connecting members 14 and 24 of the main display panel unit 10 and the sub-display panel unit 20.

According to embodiments of the present invention as described above, a secured electrical and communicational structure can be embodied through the first and second film connecting members 14 and 24 in the main display panel unit 10 and the sub-display panel unit 20. Therefore, the portable terminal can display a high-definition video content on the main display panel unit 10 and the sub-display panel unit 20.

According to embodiments of the present invention, the main display panel unit 10 and the sub-display panel unit 20 are combined with clear conjunction by the first and second hinge members 15 and 25, thereby correctly arranging one side of the flat screen 13 in the main display panel unit 10 with the flat screen 23 of the sub-display panel unit 20 during its unfolding operation, and as a result it can provide a feature that two screens are realized in a single large screen with little seams.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A portable terminal, comprising:
    a first display panel unit for displaying a first image;
    a second display panel unit for displaying a second image;
    a hinge unit for connecting the second display panel unit with the first display panel unit with supporting rotational shift; and
    a film connecting unit facing the hinge unit, wherein a film is inserted for connecting the first display panel unit with the second display panel unit electrically.

2. The portable terminal of claim 1, wherein the hinge unit comprises:
    a first hinge member mounted on the first display panel unit and having a cut piece and a connecting piece of which both sides are open;
    a second hinge member mounted on the second display panel unit and having one side which is open to communicate with one side of the first hinge member; and
    a hinge axis inserted into the first and the second hinge members.

3. The portable terminal of claim 2, wherein the hinge axis has a first hinge piece inserted into the first hinge member and a second hinge piece inserted into the second hinge member, and the diameter of the first hinge piece is greater than the diameter of the second hinge piece.

4. The portable terminal of claim 1, wherein the film connecting unit comprises:
    a first film connecting member having a connecting piece protruded from the first display panel unit, and a supporting piece caved in the first display panel unit; and
    a second film connecting member mounted on the second display panel unit and rotationally supported by the supporting piece of the first film connecting member.

5. The portable terminal of claim 4, wherein the connecting piece of the first film connecting member having upper portion protruded from the first display panel unit and lower portion guided into the inside of the first display panel unit, one side of the upper portion is closed, the other side of the upper portion is open, and the left and right sides of the lower portion are open.

6. The portable terminal of claim 4, wherein the second film connecting member has a cylindrical shape, one side of the second film connecting member is open to communicate with one side of the lower portion of the connecting piece, and a combining portion is formed to protrude in the circumferential direction in one side of the second film connecting member, and the combining portion is rotationally combined with the connecting piece of the first film connecting member.

7. The portable terminal of claim 4, wherein a film for connecting the first display panel unit with the second display panel unit electrically is provided to pass through the connecting piece of the first film connecting member and the second film connecting member.

8. A method of interconnecting first and second display panel units in a portable terminal, the method comprising:
    connecting the first display panel unit to the second display panel unit so that the first display panel unit may rotate relative to the second display panel unit;
    providing a first film connecting member on the first display panel unit;
    providing a recessed portion on the first display panel unit adjacent the first film connecting member;
    providing a second film connecting member on the second display panel unit, the second film connecting member adapted to fit into the recessed portion of the first display panel unit and be positioned adjacent the first film connecting member to provide a channel between the first and second display panel units; and
    routing an electrical film through the channel to electrically interconnect the first and second display panel units.

9. The method of claim 8 wherein the operation of connecting comprises providing a hinge connected to the first and second display panel units.

10. The method of claim 8,
    wherein providing a first film connecting member comprises providing a cylindrical connecting member having openings on two opposing sides that forms a portion of the channel; and
    wherein providing a recessed portion comprises forming an arcuate supporting piece on the first display panel unit.

11. The method of claim 8 wherein providing a second film connecting member comprises providing a cylindrical member attached to the second display panel unit, the cylindrical member having an open side adapted to be positioned adjacent the cylindrical connecting member and having an inner surface, with a portion of the channel being formed between the open side and the inner surface.

12. The method of claim 8 wherein the electrical film comprises a tape carrier package or chip on film.

13. The method of claim 8 wherein the first and second display panel units are operable to function in combination to display a visual image.

14. A portable terminal, comprising:
    a first display panel unit operable to display an image;
    a second display panel unit operable to display an image;
    a hinge member connected to the first and second display panel units and operable to allow the first display panel unit to rotate relative to the second display panel unit; and
    a film connecting member connected to the first and second display panel units, the film connecting member adapted to receive an electrical film for electrically connecting the first display panel unit to the second display panel unit.

15. The portable terminal of claim 14 wherein the portable terminal comprises a cellular phone.

16. The portable terminal of claim 14 wherein the film connecting member comprises:
- a first film connecting member having a connecting piece extending from the first display panel unit and a supporting piece recessed in the first display panel unit; and
- a second film connecting member on the second display panel unit, the second film connecting member being rotationally supported by the supporting piece of the first film connecting member.

17. The portable terminal of claim 16 wherein the first film connecting member has a cylindrical shape and comprises an upper portion extending from the first display panel unit and a lower portion recessed into the first display panel unit, the first film connecting member having one side of the upper portion which is closed and another side of the upper portion that is open, and the first film connecting member further having the left and right sides of the lower portion that are open.

18. The portable terminal of claim 17 wherein the second film connecting member has a cylindrical shape with one side of the second film connecting member being open to communicate with one side of the lower portion of the first film connecting member, and the second film connecting member including a combining portion extending circumferentially on one side of the second film connecting member, the combining portion being adapted to be rotationally connected to the first film connecting member.

19. The portable terminal of claim 18 wherein the film passes through the first and second film connecting members.

20. The portable terminal of claim 14 wherein the hinge member and film connecting member are positioned on opposite sides of the first display panel unit.

* * * * *